United States Patent [19]

Goetz

[11] Patent Number: 4,879,628
[45] Date of Patent: Nov. 7, 1989

[54] HIGH VOLTAGE MEASUREMENT CAPACITOR

[76] Inventor: Bernhard Goetz, 55 W. 14th St., New York, N.Y. 10011

[21] Appl. No.: 259,247

[22] Filed: Oct. 18, 1988

[51] Int. Cl.$^4$ .............................................. H01G 4/04
[52] U.S. Cl. .................................................... 361/327
[58] Field of Search ................ 361/323, 272, 313, 327

[56] References Cited

U.S. PATENT DOCUMENTS

| | | | |
|---|---|---|---|
| 1,952,158 | 3/1934 | Clark et al. | 361/323 X |
| 3,829,742 | 8/1974 | Muller | 317/103 |
| 3,829,744 | 8/1974 | Raupach | 317/244 |
| 4,408,818 | 10/1983 | Markarian | 361/272 X |
| 4,467,397 | 8/1984 | Thiel et al. | 361/313 X |
| 4,618,914 | 10/1986 | Sato et al. | 361/323 X |
| 4,654,751 | 3/1987 | Tokura et al. | 361/323 X |

OTHER PUBLICATIONS

F. K. Harris, Electrical Measurements (© 1952: John Wiley & Sons, Inc., New York), pp. 678–679.
B. Hague, Alternating Current Bridge Methods (© 1957, Sir Isaac Pitman & Sons, Ltd., London), pp. 176–182.

Primary Examiner—Donald A. Griffin
Attorney, Agent, or Firm—Peter L. Michaelson

[57] ABSTRACT

A three-terminal capacitor having high and low voltage electrodes coaxially aligned in a housing which serves as a ground plane includes a non-gaseous dielectric material filling the cavity of the housing. In the preferred embodiments, the dielectric is either an oil or plastic. A source of power voltage can be generated by arranging a tertiary electrode proximate to the high voltage electrode and selecting the ratio of surface areas to produce sufficient current to power an external device.

9 Claims, 3 Drawing Sheets

HIGH VOLTAGE MEASUREMENT CAPACITOR

FIELD OF THE INVENTION

This invention relates generally to a high voltage capacitor and, more specifically, to a three-terminal, solid-filled or liquid-filled high voltage capacitor adapted for measurements in a field environment.

BACKGROUND OF THE INVENTION

In a controlled environment such as a laboratory setting, it is a common practice to utilize a gas-filled, three-terminal type capacitor for measuring high voltages. Such a capacitor exhibits a relatively low loss factor and is not influenced by external fields, both characteristics being useful to effect precise measurements in laboratory test set-ups.

Representative of these conventional capacitor types is the arrangement disclosed in U.S. Pat. No. 3,829,742 issued to Muller on Aug. 13, 1974. In this arrangement, cylindrically-shaped high and low voltage electrodes are disposed in coaxial relationship within a sealed chamber or housing. The high voltage electrode is suspended from a combined high voltage bushing-lead structure which forms the top of the chamber. The low voltage electrode, which encompasses the high voltage electrode, rests on a layer of insulation material seated on a floor plate of the chamber. A low voltage lead is introduced into the chamber through an insulated bushing formed integrally with the wall of the chamber. The chamber is grounded to mitigate the effects of external fields. The interior of the chamber is filled with a gas under pressure.

This type of gas-filled capacitor exhibits a phenomenon, called "statistical breakdown" in the high-voltage art, wherein an internal flashover or arcing between the electrodes may occur at a random time. The flashover becomes, in effect, a short between the electrodes, leading to a very high surge of current from the high voltage line attached to the capacitor through the electrodes to ground. In turn, this current flow generates heat internal to the capacitor, thereby causing further pressurization of the gas. If left unchecked as is the case with a field installation, specifically a connection to a power line, an explosion may occur. In the laboratory, it is possible to substantially reduce such current surges by utilizing external current-limiting circuitry. Because of controlled conditions and stabilizing efforts possible in the laboratory, dangerous situations such as explosions are precluded.

However, while useful in the laboratory, the gas capacitor may be susceptible to the deleterious effects of a harsh field environment, particularly in revenue metering applications wherein the capacitor is permanently installed on a customer premises. For instance, because of ambient temperature variations, the capacitor components are subjected to degrading influences over time, thereby increasing the likelihood of a flashover. It is impractical to provide in the field setting the sophisticated current limiting circuitry deployed in the laboratory because of cost and complexity. Moreover, pressurized gas components attached to a power line are bulky and complicate the accessibility and work activity of craft personnel.

Also, in the laboratory, an independent voltage source is readily available to energize ancillary circuitry which may then be used in support of measurement applications utilizing the three-terminal capacitor. In the field, however, it would often be preferable to derive a voltage signal for auxiliary circuits directly from the high voltage source being measured.

In revenue metering applications for power utility companies, it is necessary to derive both a current and voltage indicative of power usage in order to measure the usage. Current detection has been effected with a current transformer which is not formed integrally with the three-terminal capacitor. This is costly and proliferates the number of distinct components placed along the transmission line.

SUMMARY OF THE INVENTION

These shortcomings as well as other limitations in the art are obviated, in accordance with the present invention, by a three-terminal capacitor arrangement which in its basic form has a non-gaseous dielectric filling the housing.

Broadly speaking, the illustrative embodiments of the capacitor include both high and low voltage electrodes aligned in energy transfer relation to form the plates of the capacitor. The electrodes are disposed in a sealed housing which forms a ground plane. The housing is filled with a non-gaseous dielectric material, typically either oil or polypropylene in the preferred embodiments.

To derive a voltage signal for ancillary circuitry, a tertiary electrode is interposed in the energy transfer path of the capacitor plates. To generate a current signal indicative of the current flow in the associated power line, a core encompasses an appropriate high voltage (HV) lead carrying the power line current. The voltage signal and current signal may be combined to obtain power usage. Also, temperature variations can be compensated by a thermistor disposed within the housing.

BRIEF DESCRIPTION OF THE DRAWINGS

The structure and operation of this invention will be better understood by considering the detailed description of the illustrative embodiments thereof, which follow, in conjunction with the accompanying drawing, in which.

DETAILED DESCRIPTION

Figure 1:
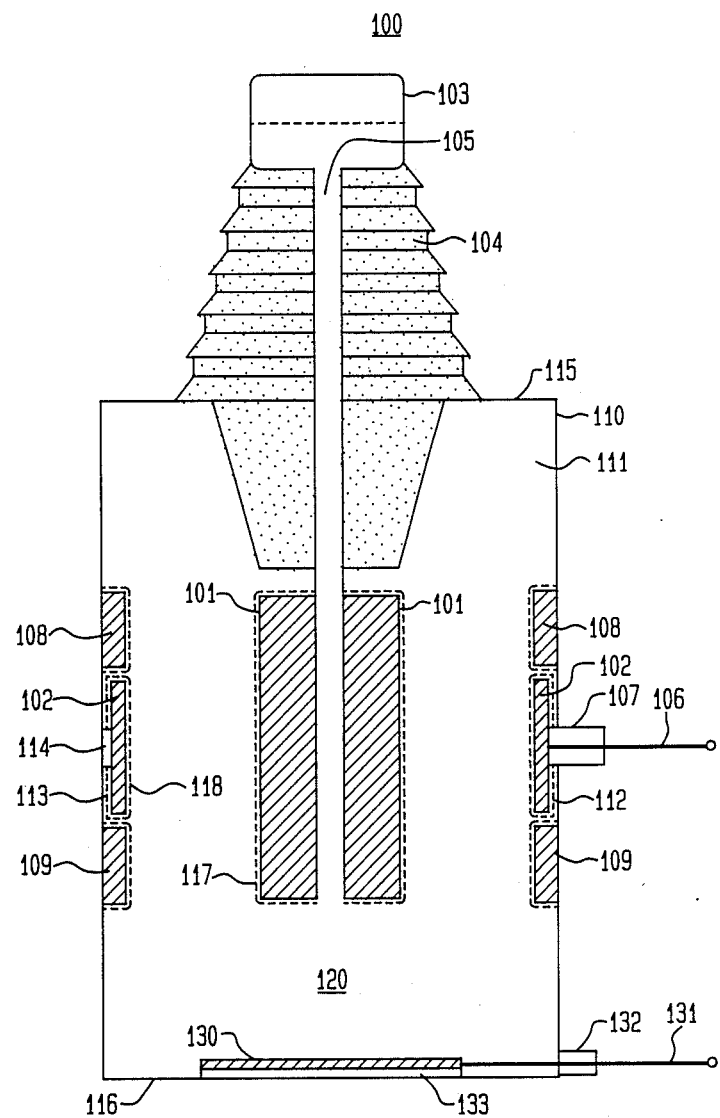
FIG. 1 is a cross-sectional view of one illustrative embodiment of a three-terminal capacitor in accordance with the teachings of the present invention.

Three-terminal capacitor 100 shown in cross-sectional view in FIG. 1 is an illustrative embodiment of one aspect of the present invention. In this depiction, capacitor 100 includes: hollow, cylindrically-shaped metallic housing 110 defining a cylindrical cavity 111 as the volume enclosed by walls 112, 113, 115 and 116 of housing 110; cylindrically-shaped high voltage (HV) electrode 101 formed integrally with vertically-extending metallic connection pipe 105 and disposed proximate to the center of cavity 111; and cylindrically-shaped low voltage (LV) electrode 102 located proximate to vertical walls 112 and 113 of housing 110. Hollow pipe 105 is introduced into cavity 111 via HV bushing 104 which is formed integrally with top surface 115 of housing 110. Hollow pipe 105 has expansion reservoir 103 formed integrally with its top end. Reservoir 103, being metallic, also serves as the connection point for the HV power line (not shown) being tapped or measured. LV insulator bushing 107 couples LV lead 106 to LV electrode 102 through housing wall 112. Insulator portion 114 fixedly maintains LV electrode 102 in noncontact relation with left wall 113. Cylindrically-shaped guard electrodes 108 and 109, adjacent to the top and bottom portions of LV electrode 102, respectively, are in contact with walls 112 and 113 and insure a uniform electric field via the Faraday shield effect between HV electrode 101 and LV electrode 102.

For a field-grade type capacitor, all of cavity 111, pipe 105 and part of reservoir 103 are filled with either a liquid or solid dielectric shown by reference numeral 120 in FIG. 1. Transformer oil such as General Electric 10C is one example of a liquid dielectric and polypropylene is an example of a plastic-type solid dielectric. In the liquid or oil-based implementation, expansion reservoir 103 is of sufficient size to contain the expanded volume of liquid caused by a high operating or ambient temperature. In the solid-based implementation, expansion reservoir 103 may be reduced in size relative to the size required of a liquid-based version; however, reservoir 103 is still required because some materials, such as polypropylene, exhibit a significant temperature coefficient of expansion. A positive pressure is generated by the height of the column of dielectric in pipe 105 and reservoir 103. This pressure prevents the formation of voids, that is, bubbles in the dielectric, thereby mitigating dangerous situations such as a flashover condition.

Figure 2:
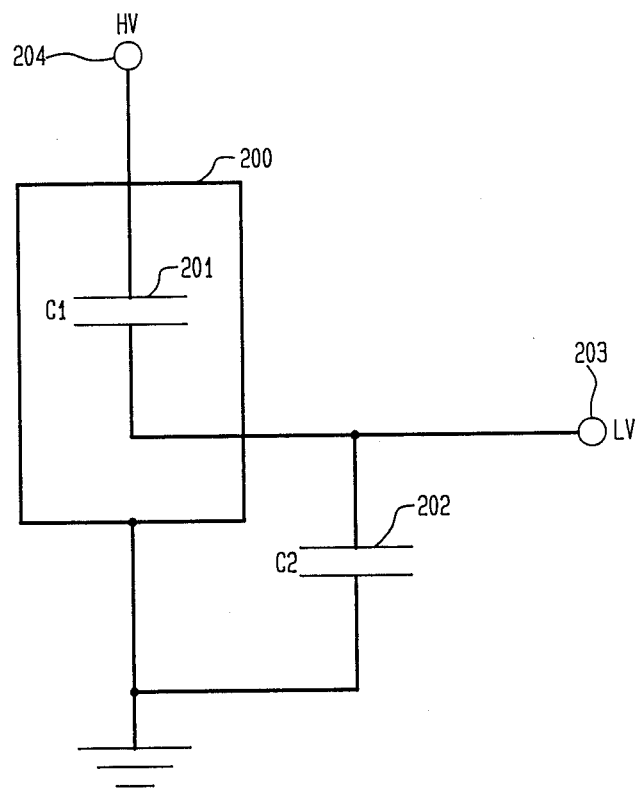
FIG. 2 is a schematic diagram of one arrangement for utilizing the capacitor of FIG. 1 in a measurement circuit.

The schematic diagram of FIG. 2 indicates how field-type capacitor 100 may be used in practice. The capacitance of capacitor 100 in FIG. 1 is represented in FIG. 2 by capacitor 201 having capacitance value C1. Another conventional capacitor 202 having capacitance value C2 is in series with C1. Ground plane 200 is shown as encompassing capacitor 201. For the capacitor of FIG. 1, ground plane 200 may be identified physically with housing 110. As an example of the voltage reduction capability of capacitor 201, some typical values are considered. If the value of capacitor C1 equals 50 picofarads (pf) and the value of capacitor C2 equals 1 microfarads (mf), and a 135 kV AC line serves as input to HV terminal 204, then the voltage appearing at LV terminal 203 is approximately 6.749 V which means that basically the full voltage is dropped across capacitor 201.

It may be necessary in solid dielectric capacitor structures to apply pliable bonding agent 117 and 118 (as shown in FIG. 1) to electrodes 101 and 102, respectively, to preclude the formation of air-gaps or voids between the metal electrodes and the solid dielectric. Bonding agents 117 and 118, placed as a thin layer on the electrodes, serves as a "dielectric bridge" between the metal of the electrodes and the solid dielectric. The properties and utility of such an agent, commonly referred to in the high voltage art as a "semiconductor" compound, are well-known along with its formulation.

Figure 3:
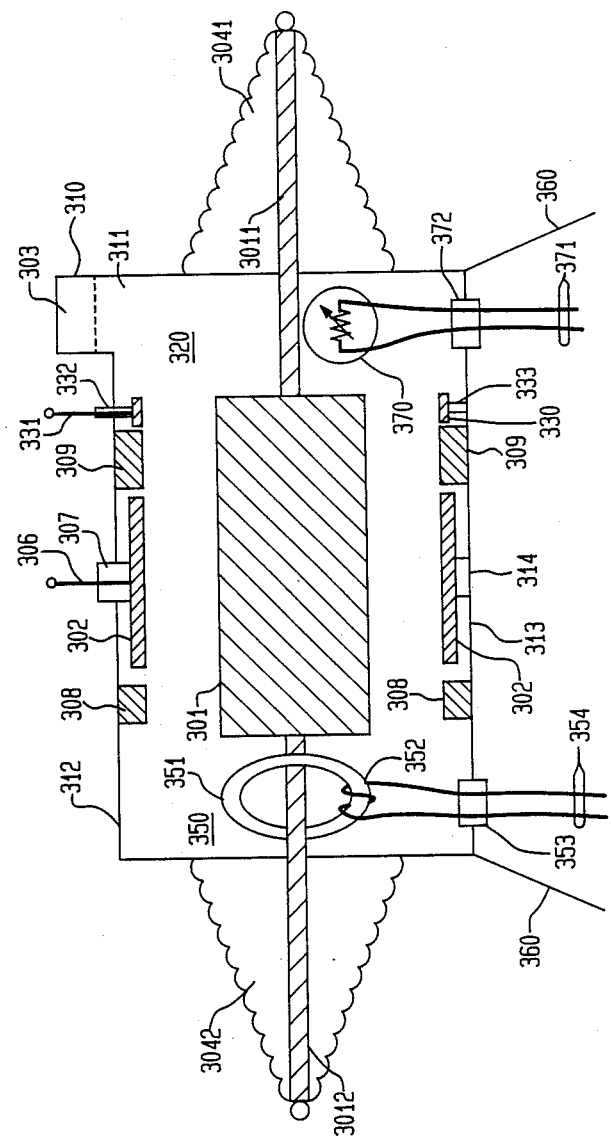
FIG. 3 is a cross-sectional view of another illustrative embodiment of the inventive capacitor and which depicts additional components that may be used to derive signals for measuring power usage.

FIG. 3 shows in cross-sectional view another embodiment of three-terminal capacitor 300 illustrating other aspects of the present invention. The type of capacitor represented by FIG. 3 is useful for in-line or series insertion in the path of a transmission line. Similar components from FIG. 1 also shown in FIG. 3 have reference numerals incremented by 200 to facilitate comparison of the two structures. Thus, for example, LV electrode 102 in FIG. 1 has a counterpart in FIG. 3 shown as LV electrode 302. A bonding agent, shown in FIG. 1 by indicia 117, 118, is not shown in FIG. 3 but is assumed to be applied to all electrodes of FIG. 3 in the same manner as described with respect to FIG. 1.

Capacitor 300 has a horizontal orientation and rests on pedestals 360. Housing 310 defines cavity 311 as the interior of housing 310. Reservoir 303 is formed as a protrusion in the upper right corner of housing 310. HV and LV electrodes 301 and 302, respectively, are in coaxial relationship and are disposed in energy transfer relation in cavity 311. Electrode 301 is connected to right and left heavy-duty leads 3011 and 3012 via HV bushings 3041 and 3042, respectively. LV lead 306 connects to LV electrode 302 through LV bushing 307. Cylindrical guard electrodes 308 and 309 are shown proximate to LV electrode 302 and are in electrical contact with walls 312, 313. Dielectric 320, either liquid or solid, fills cavity 311 and part of reservoir 303.

To this point in the discussion, components 130-133 in FIG. 1 and components 330-333 of FIG. 3 have not been described; these components, which will now be described, serve as a means for tapping the power supplied to the HV electrode 101 and 301 so as to provide voltage signal to energize external, ancillary circuitry. With respect to FIG. 1, tertiary electrode 130 is disc-shaped and it rests on a layer of insulation material 133 on floor 116 of housing 110. Signal lead 131 connects to electrode 130 through signal bushing 133 formed integrally with wall 112. Regarding FIG. 3, tertiary electrode 330 is cylindrically-shaped and it is arranged adjacent to guard electrode 309 and oppositely situated from the HV electrode in coaxial relation with both the LV and HV electrodes. Signal lead 331 is connected to electrode 330 via bushing 332 in wall 312. Insulated spacer 333 keeps electrode 330 from contacting wall 313. With respect to electrical properties, the ratio of the surface area of the signal electrode (130 or 330) to the surface area of the HV electrode (101 or 301) should be selected to produce sufficient output current to power an external device.

Also shown in FIG. 3 is current transformer 350 comprising ring core 351 and secondary winding 352. Core 351 encompasses heavy-duty lead 3012 which serves as the primary of current transformer 350. Wires 354 form secondary winding 352 and are introduced into cavity 311 via bushing 353. The physical and electrical parameters of core 351 and the number of turns of secondary 352 may be conveniently chosen to provide an indication of the current flow through leads 3011 and 3012 in series for metering purposes. The current available on leads 354, when multiplied by the signal voltage present on lead 306, results in an indication of the power usage.

Also shown in FIG. 3 is thermistor 370 which is disposed in cavity 311 so as to compensate for temperature variations occurring within housing 310. Thermistor 370 has an appropriate temperature coefficient so this characteristic may be used to offset the temperature coefficient of dielectric 320 via external stabilization circuitry. Changes in the resistance of thermistor 370 due to temperature variations are provided by leads 371 emanating from housing 310 through bushing 372. Generally speaking, a thermistor will only be required when the dielectric has a high temperature coefficient, such as that commonly found with oil dielectrics.

It is to be further understood that the capacitor structures described herein are not limited to the specific embodiments shown by way of illustration but may assume other embodiments limited only by the scope of the appended claims.

I claim:

1. A capacitor for use with a high voltage line, the capacitor including:
   a hollow cylindrical housing with the axial direction of the housing having a horizontal orientation, the housing defining a cavity and including a vertical protrusion in the circular wall of the cylinder defining a reservoir;
   a cylindrical high voltage (HV) electrode aligned axially with the housing and disposed proximate to the center line of the cavity;
   first and second HV bushings attached to the opposing transverse ends of the housing;
   first and second HV leads introduced into the cavity via the first and second HV bushings and wherein the internal end of each of the HV leads couples to the HV electrodes at its opposing transverse ends and the external end of each of the HV leads forms first and second HV terminals accessible for series insertion into the high voltage line;
   a cylindrical low voltage (LV) electrode arranged in coaxial relation between the housing and the HV electrodes;
   a LV bushing attached to the circular wall of the housing;
   a LV lead introduced into the cavity via the LV bushing and wherein the internal end of the LV lead couples to the LV electrode and the external end of the LV lead forms a LV terminal; and
   a non-gaseous dielectric material filling the cavity and a portion of the reservoir.

2. The capacitor as recited in claim 1 further comprising a cylindrical signal electrode arranged in coaxial relation between the housing and the HV electrode and adjacent to the LV electrode, a signal bushing attached to the circular wall of the housing, and a signal lead introduced into the cavity via the signal bushing and wherein the interior end of the signal lead couples to the signal electrode and the external end of the signal lead forms a signal terminal.

3. The capacitor as recited in claim 2 further comprising a transformer core encompassing one of the HV leads which forms the primary of a current transformer, a secondary winding on the core comprising secondary leads, and a secondary bushing attached to the circular wall of the housing for introducing the secondary leads into the cavity.

4. The capacitor as recited in claim 3 further comprising a thermistor interposed in the dielectric material, thermistor leads coupled to the thermistor, and a thermistor bushing attached to the circular wall of the housing for introducing the thermistor leads into the cavity.

5. The capacitor as recited in claim 4 further comprising a semiconductor compound applied as a thin layer to the HV, LV and signal electrodes.

6. An improved capacitor for high voltage measurements comprising:
   a hollow housing defining a cavity;
   a high voltage (HV) electrode disposed in the housing, a HV bushing attached to the housing and a HV lead introduced into the cavity via the HV bushing, wherein the interval end of the HV lead couples to the HV electrode and the external end of the HV lead forms a HV terminal, wherein the HV lead is hollow and includes a reservoir formed at the external end of the HV lead and wherein the HV electrode is hollow,
   a low voltage (LV) electrode disposed in the housing and encompassing the HV electrode, a LV bushing attached to the housing and a LV lead introduced into the cavity via the LV bushing, wherein the internal end of the LV lead couples to the LV electrode and the external end of the LV lead forms a LV terminal; and
   a liquid dielectric material filling the cavity including the interelectrode gap between the HV electrode and the LV electrode, a portion of the reservoir and the hollows in said HV lead and said HV electrode.

7. An improved capacitor for high voltage measurements comprising:
   a hollow housing defining a cavity;
   a high voltage (HV) electrode disposed in the housing, a HV bushing attached to the housing and a HV lead introduced into the cavity via the HV bushing, wherein the interval end of the HV lead couples to the HV electrode and the external end of the HV lead forms a HV terminal;
   a low voltage (LV) electrode disposed in the housing and encompassing the HV electrode, a LV bushing attached to the housing and a LV lead introduced into the cavity via the LV bushing, wherein the internal end of the LV lead couples to the LV electrode and the external end of the LV lead forms a LV terminal;
   a tertiary electrode disposed in said housing and being in an energy transfer relation with said HV electrode;
   a tertiary bushing formed integrally with said housing; and
   a tertiary lead introduced into said cavity via said tertiary bushing, said tertiary electrode being arranged to provide a pre-determined voltage signal via said tertiary lead for a given voltage applied to the HV lead; and
   a non-gaseous dielectric material filling the cavity including the interelectrode gap between the HV electrode and the LV electrode.

8. An improved capacitor for high voltage measurements comprising:
   a hollow, cylindrically-shaped housing defining a cavity;
   a cylindrically-shaped high voltage (HV) electrode, a HV bushing formed integrally with the housing and a HV lead introduced into the cavity via the HV bushing, wherein the internal end of the HV lead couples to the HV electrode and the external end of the HV lead forms a HV terminal;
   a cylindrically-shaped low voltage (LV) electrode, a LV bushing formed integrally with the housing and a LV lead introduced into the cavity via the LV bushing, wherein the internal end of the LV lead couples to the LV electrode and the external end of the LV lead forms a LV terminal;
   with the HV and LV electrodes being arranged in coaxial relation in the cavity so that the LV electrode encompasses the HV electrode;
   a tertiary, disc-shaped electrode;
   a tertiary bushing formed integrally with the housing;
   a tertiary lead introduced into the cavity via said tertiary bushing, said tertiary electrode being disposed in a plane proximate to the base of the housing, said plane being substantially perpendicular to the coaxial orientation of the HV and LV electrodes; and a non-gaseous dielectric material filling the cavity including the coaxial space between the HV and LV electrodes.

9. The improved capacitor as recited in claim 8 wherein the HV and LV electrodes and said tertiary electrode have a coating of semiconductor compound.

* * * * *